(12) United States Patent
Willner

(10) Patent No.: US 8,507,740 B2
(45) Date of Patent: Aug. 13, 2013

(54) BIOREFINERY METHOD

(75) Inventor: Thomas Willner, Hamburg (DE)

(73) Assignee: Nexxoil AG, Zurich (CH)

( * ) Notice: Subject to any disclaimer, the term of this patent is extended or adjusted under 35 U.S.C. 154(b) by 0 days.

(21) Appl. No.: 13/380,343

(22) PCT Filed: Jun. 22, 2010

(86) PCT No.: PCT/DE2010/000705
§ 371 (c)(1),
(2), (4) Date: Mar. 12, 2012

(87) PCT Pub. No.: WO2010/149137
PCT Pub. Date: Dec. 29, 2010

(65) Prior Publication Data
US 2012/0165582 A1    Jun. 28, 2012

(30) Foreign Application Priority Data

Jun. 26, 2009  (DE) .......................... 10 2009 030 843

(51) Int. Cl.
*C10G 1/00*    (2006.01)

(52) U.S. Cl.
USPC .......................................... 585/240; 585/258

(58) Field of Classification Search
None
See application file for complete search history.

(56) References Cited

U.S. PATENT DOCUMENTS

| 8,119,583 B2 * | 2/2012 | Day et al. ...................... 510/152 |
| 2008/0053870 A1 | 3/2008 | Marker et al. |
| 2008/0072478 A1 | 3/2008 | Cooper |
| 2009/0082604 A1 | 3/2009 | Agrawal et al. |
| 2009/0084666 A1 | 4/2009 | Agrawal et al. |
| 2009/0165378 A1 | 7/2009 | Agblevor |

FOREIGN PATENT DOCUMENTS

| JP | 2006-63310 A | 3/2006 |
| WO | WO 2007/047063 A2 | 4/2007 |
| WO | WO 2009/018531 A1 | 2/2009 |
| WO | WO 2009/029660 A2 | 3/2009 |

OTHER PUBLICATIONS

International Search Report of PCT/DE2010/000705 (Dec. 6, 2010).
M.F. Demirbas, "Biorefineries for Biofuel Upgrading: A Critical Review", Applied Energy, vol. 86 (May 27, 2009) pp. S151-S161.

* cited by examiner

*Primary Examiner* — Tam M Nguyen
(74) *Attorney, Agent, or Firm* — Millen, White, Zelano & Branigan, P.C.

(57) ABSTRACT

The invention relates to a method for producing a petrochemical product from biomass, involving the following steps: dewatering and drying biomass; producing crude oil by the direct liquefaction of the dried biomass; hydrogenating the crude oil into hydrocarbons; and refining the hydrocarbons into a petrochemical product. Said method is characterized in that the hydrogen used for hydrogenating the crude oil is obtained from the wastewater accumulated during the dewatering and drying of the biomass and/or during the direct liquefaction and from the residue accumulated during the direct liquefaction.

11 Claims, 1 Drawing Sheet

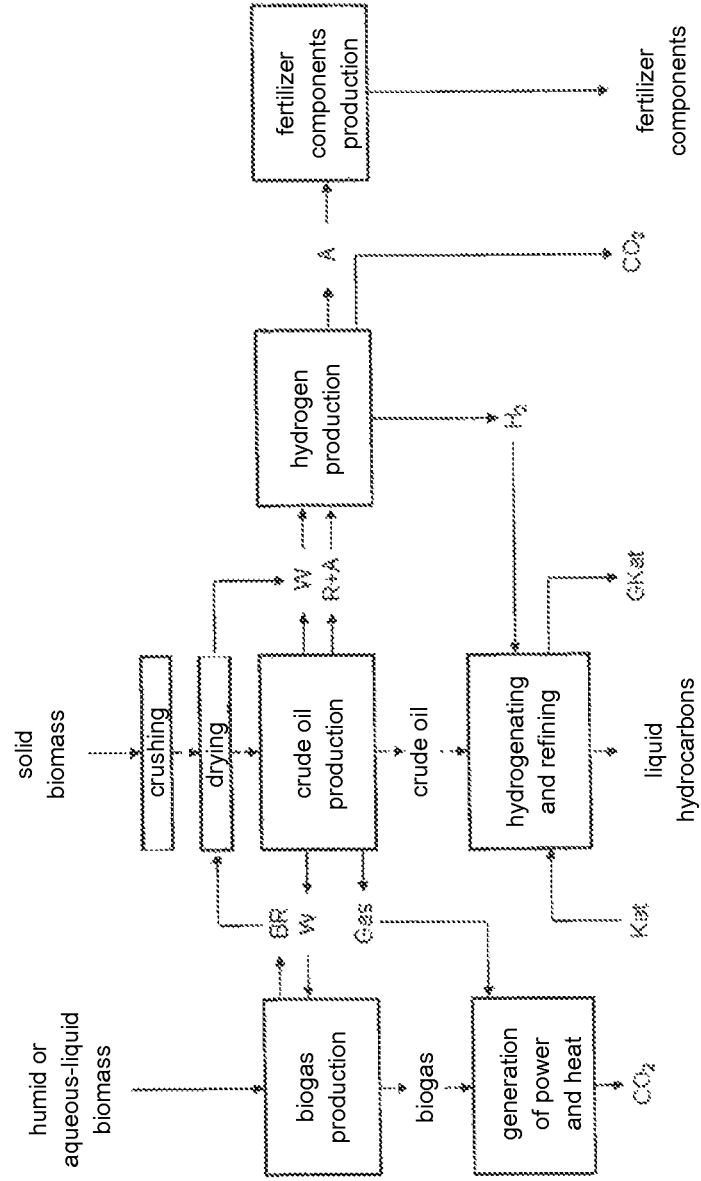

BIOREFINERY METHOD

The invention relates to a method for producing a petrochemical product from biomass, involving the following steps: dewatering and drying biomass; producing crude oil by the direct liquefaction of the dried biomass; hydrogenating the crude oil into hydrocarbons; and refining the hydrocarbons into a petrochemical product.

The term biomass designates the entirety of the mass of organic materials including those contained in biogenic residues and sewage sludges.

Plant biomass is composed essentially from the three biopolymers cellulose, hemicelluloses (also called polyoses) and lignin. Their share in wood in the moderate temperate zones is usually 97-99% of the wood substance. 30-35% thereof is cellulose, 15-35% is hemicellulose and 20-35% is lignin. Considerably smaller portions have extract substances (1-3%) and inorganic components (ash) (0.1-0.5%). In general, the lignin proportion in softwoods is higher than in hardwoods; in hardwoods, the hemicellulose proportion is slightly higher.

Producing liquid hydrocarbons as a basis for petrochemical products such as for instance technically usable (i.e. conforming to standards) heating oils and fuels can be achieved in different ways, e.g. by complete decomposition of the molecule into the elements or small molecules by means of gasification at very high temperatures and subsequent total synthesis of new compounds (this approach is followed e.g. in the Fischer-Tropsch synthesis) or by direct liquefaction at moderate temperatures under reducing (i.e. hydrogenating) and/or catalytic conditions.

For going without the energy-consuming gasification and total synthesis of new compounds, the direct liquefaction under reducing conditions must be selected. A very comprehensive description of all existing methods for the direct liquefaction can be found in the study "Direktverflüssigung von Biomasse—Reaktionsmechanismen and Produktverteilungen" (Direct Liquefaction of Biomass—Reaction Mechanisms and Product Distributions)—114-50-10-0337/05-B by Prof. Dr. Frank Behrendt (published in the internet under http://www.fnr-server.de/ftp/pdf/literatur/pdf_253studie_zur_direktverfluessigung_final_komprimiert.pdf.).

The challenge for every method for the direct liquefaction of biomass can be described, according to Behrendt, by the following gross chemical equation:

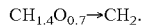

$$CH_{1.4}O_{0.7} \rightarrow CH_2.$$

On the one hand, oxygen must be removed, on the other hand, external hydrogen must be supplied.

The study shows the necessity of using hydrogen. If no hydrogen is used, the intermediate and end products have high proportions of annular components. In order to obtain straight-chain hydrocarbons therefrom, further steps have to be carried out. The shown reaction pathways without using hydrogen clearly show that the product series contains a not negligible proportion of oxygen atoms. The oxygen proportion in the various components is significantly higher (10-50%), compared to crude oil, with the consequence, among others, of a lower calorific value of the product oil. In addition, this increased proportion of oxygen means that the generated oil is very reactive and is prone to decomposition or undesired consecutive reactions. Further processing (so called upgrading) is thus indispensable. If hydrogen is used during the liquefaction, in order to saturate reactive intermediate products (e.g. radicals) and to eliminate functional groups containing oxygen, and if moreover a larger number of further method and processing steps are carried out, then it will be possible to specifically produce hydrocarbons of certain size distributions. This is an important condition for producing liquid fuels and heating oils conforming to standards.

In the historic Pittsburg Energy Research Center (PERC) method, which is carried out under very high pressure with aqueous medium, dissolved catalytic converter, cycle oil and carbon monoxide-hydrogen gas mixture, it was found that the cycle oil contains too many aromatic and oxygen-containing components, so that the hydrogen demand for the fuel production cannot be covered by the cycle oil.

The equally historic Lawrence Berkeley Laboratory (LBL) method, which is carried out without cycle oil, but otherwise under the same expensive conditions as the PERC method, does not produce hydrocarbons, either. Both methods are not carried out anymore because of the enormous complexity for technical and economical reasons.

On the other hand, by the hydrolytic HTU method (hydrothermal upgrading), many different biomasses (even with high moisture content) can be liquefied under a very high pressure. The developing tar-like products containing oxygen have still to be converted by means of the HDO (hydrodeoxygenation) under addition of hydrogen into hydrocarbon-oil fractions.

Under hydrogen pressure and using expensive noble metal catalytic converters, the direct catalytic pressure liquefaction according to the BFH method is carried out. In the BFH method, too, the obtained crude oils are not free from oxygen and need further hydrogenation with hydrogen and a series of processing steps for the conversion into hydrocarbon-oil fractions.

The pressure hydrogenation method/DoS (direct liquefaction of organic substances) according to Willner is also carried out under hydrogen pressure, but without catalytic converters. In the DoS method, too, the obtained crude oils contain oxygen and need further hydrogenation with hydrogen and a series of processing steps for the conversion into hydrocarbon-oil fractions.

All direct liquefaction methods mentioned above, including the historic ones occur under pressure and are thus very expensive. In particular the entry of solid biomass into the pressure reactor always poses a problem with regard to consistency of the biomass arriving in the reactor as well as with regard to feasibility, reliability and cost effectiveness of the process. Further, pressure installations are all in all more expensive and in operation more susceptible to problems than atmospheric pressure installations.

Besides, there are the following direct liquefaction methods working at atmospheric pressure:

The CPD method (catalytic pressure-less depolymerization) of Alphakat as well as Willner's variant are carried out in a heavy oil phase as the reaction medium at atmospheric pressure and need pulverized solid-material catalytic converters. The latter is an economical problem, since the catalytic converters are expensive and lose very quickly their activity in the reactor by coking. Furthermore, in the CPD method, new heavy oil needs to continuously be fed, since when using biomass, the reactor sump oil phase is not automatically regenerated.

Basically, the flash pyrolysis is a very quick heating process to reaction temperature at atmospheric pressure. Thereby, a high yield of crude oil occurs, which has however an extremely low calorific value in the order of only 15 to 17 MJ/kg corresponding to a very high oxygen content of more than 50 wt. % hat. Therefore, the hydrogen demand for a hydrogenating conversion of the flash pyrolysis oil into hydrocarbons is so high that the complete process becomes uneconomical.

The LTC method (low-temperature conversion) of Prof. Bayer (University Tübingen) is a simple pyrolysis method at atmospheric pressure without quick heating. This method is however not suitable for the liquefaction of plant biomass, but is mainly used for sewage sludge liquefaction.

It is therefore the object of the invention to provide an energetically favorable method, by means of which any kind of biomass can be processed without residues and wastewater to high-quality petrochemical hydrocarbon products. In particular, it should be possible to carry out the method at atmospheric pressure and without addition of catalytic converters.

This object is achieved by the method involving the steps listed in claim 1. The subclaims represent advantageous embodiments of the invention.

The invention is explained in more detail with reference to a particularly preferred sequence of steps shown in the single FIG. 1.

In FIG. 1 can be seen a block flow diagram of the method according to the invention.

By combination and cross-linking of a suitable direct liquefaction method for extracting crude oil with biogas production, combined heat and power plant, internal hydrogen production, crude oil hydrogenation and refining to petrochemical hydrocarbon products as well as minerals processing to fertilizer components, it is for the first time possible to produce petrochemical hydrocarbon products and fertilizer from biomass without application of pressure and catalytic converters in the liquefaction step, without producing residues and wastewater and without addition of external hydrogen.

Therein the term biomass designates the entirety of the mass of organic materials including those contained in biogenic residues and sewage sludges.

The petrochemical products may comprise for instance high-quality chemicals, fuels and heating oils.

The biorefinery concept according to the invention combines a special direct liquefaction method, which processes dry biomass and remnants in a heavy oil phase, the so called sump phase, to crude oils, involving the following process units:
1. Biogas production from water-containing substrates and part of the wastewater from the direct liquefaction;
2. Combined heat and power plant, in which the biogas and the side product gas from the direct liquefaction is processed to power and heat for fulfilling the energy demands of all biorefinery processes;
3. Internal hydrogen production from the side products wastewater and solid residue from the direct liquefaction for fulfilling the complete hydrogen demands for the hydrogenation of the crude oil;
4. Hydrogenating the crude oil into hydrocarbons with integrated regeneration of catalytic converters, which are needed therefore;
5. Refining the hydrocarbons to petrochemical products such as chemicals, fuels and heating oils; and
6. Processing the remaining minerals from the educts to fertilizer components.

The particular features of the direct liquefaction step used in the method according to the invention are:
the use of the heavy oil sump phase as the reaction medium, the heavy oil sump phase automatically self-regenerating in the continuous operation;
an oil cycle is not necessary;
principle of reactive distillation (reactor simultaneously is first distillation step, i.e. the reaction products are removed by distillation from the reactor);
the method is carried out at atmospheric pressure; and
catalytic converters are not required.

Further, the side products solid residue and wastewater surprisingly are obtained during the direct liquefaction method in the heavy oil sump phase according to the invention in such quantities and proportions that, considering the unexpectedly low oxygen content in the crude oil compared to the flash pyrolysis, the complete hydrogen demand for the crude oil hydrogenation can be covered thereby.

It could further not be expected that the aqueous product phase from the crude oil production, in spite of its high content of organic acids, such as e.g. formic acid and acetic acid, and of toxic aldehydes, furan and phenol derivatives, can be processed in a biogas plant for producing biogas.

Particular advantages of the invention over prior art are the high efficiency in connection with the possibility of decentral economical operation, the complete raw material flexibility, the avoidance of foreign matter such as catalytic converters in the liquefaction step, the avoidance of external hydrogen and foreign energy, the freedom from residues and wastewater, the production of petrochemical products and the controllable limitation and adaptation of the products to the market situation. Finally, largely closed substance cycles also with regard to minerals or fertilizers are made possible.

A particularly advantageous embodiment of the invention is to use a method for producing crude oil from biomass at atmospheric pressure for the direct liquefaction, said method involving the following steps:
introducing dried biomass in a reactor containing heavy oil to form a sump oil phase consisting of biomass and heavy oil;
maintaining the temperature of the sump oil phase at a predetermined reaction temperature;
condensing and collecting the volatile reaction products; and
isolating and collecting the crude oils,
wherein the heavy oil phase has at least 5 wt. % organically bound oxygen.

The invention is explained in the following with reference to the example of processing wood as biomass.

In this case, about 35-40 wt. % crude oil with respect to the used biomass dry substance with an oxygen content of only approx. 20-25% are generated. The hydrogen demand for the hydrogenation of the crude oil to liquid hydrocarbons is thus only about 2.5-3.0% with respect to the used biomass dry substance. This hydrogen demand can completely be covered by the side products solid residue (approx. 10-20 wt. % with respect to the used biomass dry substance) and wastewater (approx. 25-30 wt. % with respect to the used biomass dry substance) by a water vapor gasification and carbon monoxide conversion. In favorable cases, the energy demand of the gasification can even be reduced by a partially autothermal operation using oxygen, so that the energetic consumption of the hydrogen extraction can be lowered to only approx. 5-10% of the initial biomass energy. The accumulated excess water is supplied to the biogas production and thus contributes to the process energy generation.

List of References to Fig. 1
BR=residue from the biogas production
W=aqueous product phase from the crude oil production
R=organic residue from the crude oil production
A=inorganic residue from the crude oil and hydrogen production
$H_2$=hydrogen Kat=catalytic converter
GKat=used catalytic converter
$CO_2$=carbon monoxide

The invention claimed is:

1. A method for producing a petrochemical product from biomass, involving the following steps:
   a) dewatering and drying biomass;
   b) producing crude oil by the direct liquefaction of the dried biomass;
   c) hydrogenating the crude oil into hydrocarbons; and
   d) refining the hydrocarbons into a petrochemical product, wherein
   the hydrogen used for hydrogenating the crude oil is extracted from wastewater accumulated during dewatering and drying of the biomass and/or during direct liquefaction and from residue accumulated during the direct liquefaction.

2. The method according to claim 1, wherein the hydrogen is produced by water vapor gasification and carbon monoxide conversion of wastewater and residue.

3. The method according to claim 1, wherein the direct liquefaction is carried out in a heavy oil sump phase.

4. The method according to claim 1, wherein the direct liquefaction is carried out in a regenerating heavy oil sump phase.

5. The method according to claim 1, wherein the residue is taken from the heavy oil sump phase developing during the direct liquefaction.

6. The method according to claim 1, wherein the direct liquefaction is carried out as a reactive distillation at atmospheric pressure and without catalytic converters.

7. The method according to claim 1, wherein inorganic residue accumulated during hydrogen extraction is used for fertilizer production.

8. The method according to claim 1, wherein the wastewater accumulated during the dewatering and drying of the biomass and/or during the direct liquefaction is used for biogas production.

9. The method according to claim 1, wherein the gas accumulated during the production of crude oil is used for generation of energy.

10. The method according to claim 1, wherein the biomass has plant or animal origin.

11. The method according to claim 1, wherein the petrochemical product is a fuel or a heating oil.

* * * * *